United States Patent

Shimozawa

[11] Patent Number: 5,146,449
[45] Date of Patent: Sep. 8, 1992

[54] OPTICAL DISC APPARATUS

[75] Inventor: Kenji Shimozawa, Sagamihara, Japan
[73] Assignee: TEAC Corporation, Japan
[21] Appl. No.: 462,004
[22] Filed: Jan. 8, 1990

[30] Foreign Application Priority Data

Jan. 18, 1989 [JP] Japan .................................. 1-3940

[51] Int. Cl.⁵ .................................................. G11B 7/00
[52] U.S. Cl. ..................................... 369/106; 369/116
[58] Field of Search ................ 369/106, 116, 121, 122

[56] References Cited

U.S. PATENT DOCUMENTS

| | | | |
|---|---|---|---|
| 3,705,758 | 12/1972 | Haskal | 369/116 |
| 4,114,180 | 9/1978 | Kayanuma | 369/116 |
| 4,162,398 | 7/1979 | Kayanuma | 369/116 |
| 4,532,619 | 7/1985 | Sugiyama et al. | 369/106 |
| 4,935,915 | 6/1990 | Fujiwara et al. | 369/116 |

Primary Examiner—Donald McElheny, Jr.
Attorney, Agent, or Firm—Andrus, Sceales, Starke & Sawall

[57] ABSTRACT

An optical disc apparatus comprises a light source, an optical disc, a beam splitting element for splitting a light beam from the light source into a first beam and a second beam, a light detection element for detecting the second beam and outputting a detection signal, a control circuit for controlling an intensity of the light beam from the light source on the basis of the detection signal from the detection element, so that an intensity of the light beam from the light source is uniform, and an optical system through which the first beam passes, to reproduce the information recorded on the optical disc.

14 Claims, 3 Drawing Sheets

OPTICAL DISC APPARATUS

BACKGROUND OF THE INVENTION

The present invention relates to an optical disc apparatus such as a compact disc (CD) apparatus and an optical file apparatus and the like, and more particularly to an optical disc apparatus that is improved with respect to control of an optical source. Controlling the beam light to be uniformly emitted from the optical source is important for the accurate reproduction of information in the optical disc apparatus.

FIG. 1 indicates a configuration of a conventional optical disc apparatus.

A chip 13 and a photodiode 18 for monitoring use are incorporated into a semiconductor laser element 11. The chip 13 emits a laser beam in the forward and rearward directions. A laser beam 14 that is emitted in the forward direction from the chip 13 is focused on a surface of an optical disc 12 after passing through a beam splitter 17 and an object lens 22. The laser beam 14 which is focused onto the surface of the optical disc 12 is reflected back in accordance with the information that is recorded on the optical disc 12. This reflected beam 16 is reflected by the beam splitter 17, passes through an optical system (not indicated in the figure) and is focused onto a light-receiving element (not indicated in the figure). The light receiving element outputs a signal in accordance with the reflected light 16 irradiated to it and the output signal from the light-receiving element is used as the basis for the reproduction of the information recorded on the optical disc 12.

A magnet 23 for use in writing information is provided facing the surface of the optical disc 12 to which the beam is not irradiated.

The laser beam 15 that is output in the rearwards direction from the chip 13 is irradiated to the photodiode 18. The photodiode 18 outputs a signal of a level in accordance with the intensity of the laser beam 15 which is irradiated to it. The output signal from the photo-diode 18 is supplied to an output control circuit 19. The output control circuit 19 outputs a control signal in accordance with the signal supplied from the photodiode 18. The control signal is then used as the basis for control so that the chip 13 emits a laser beam of uniform intensity.

A part of the reflected beam 16 from the optical disc passes through the beam splitter 17 without being reflected by it. This beam 20 (hereinafter termed the return beam) that has passed through the beam splitter 17 is irradiated to a semiconductor laser element 11, and a part of the return beam 20 is irradiated to a photodiode 18. The output of the photo diode is influenced by the return beam 20. Accordingly, the intensity of the laser beam from the chip 13 which is controlled on the basis of the signal output from the photodiode 18 is influenced by the return beam 20 and the intensity of the laser beam is therefore changed easily.

In general, an optical isolator is provided in front of the semiconductor laser element 11 so that it is possible for the return beam to be interrupted. However, for example, it is not generally possible to apply the optical isolator for optical disc apparatus for which it is necessary to irradiate the optical disc with a linearly polarized laser beam. In the optical disc apparatus for which such optical isolator cannot be applied, it is not possible to solve the problem of the intensity of the optical beam changing as has been described.

SUMMARY OF THE INVENTION

Accordingly, the general object of the present invention is to provide a novel and useful optical disc apparatus, in which the problems described heretofore are eliminated.

A more specific objective of the present invention is to provide an optical disc apparatus for which the intensity of the laser beam from the light source is controlled so as to be stable.

The above objects are achieved by an optical disc apparatus comprising, a light source emitting a light beam, an optical disc on which information is recorded, beam splitting means for splitting the light beam from the light source into a first beam to reproduce the information recorded on the optical disc and a second beam to control the light source, light detection means for detecting the second beam and outputting a detection signal dependent on an intensity of the second beam, control means for controlling an intensity of the light beam from the light source on the basis of the detection signal from the detection means, so that an intensity of the light beam from the light source is uniform, and an optical system through which the first beam passes, to produce the information recorded on the optical disc.

DESCRIPTION OF THE PREFERRED EMBODIMENT

Figure 1:
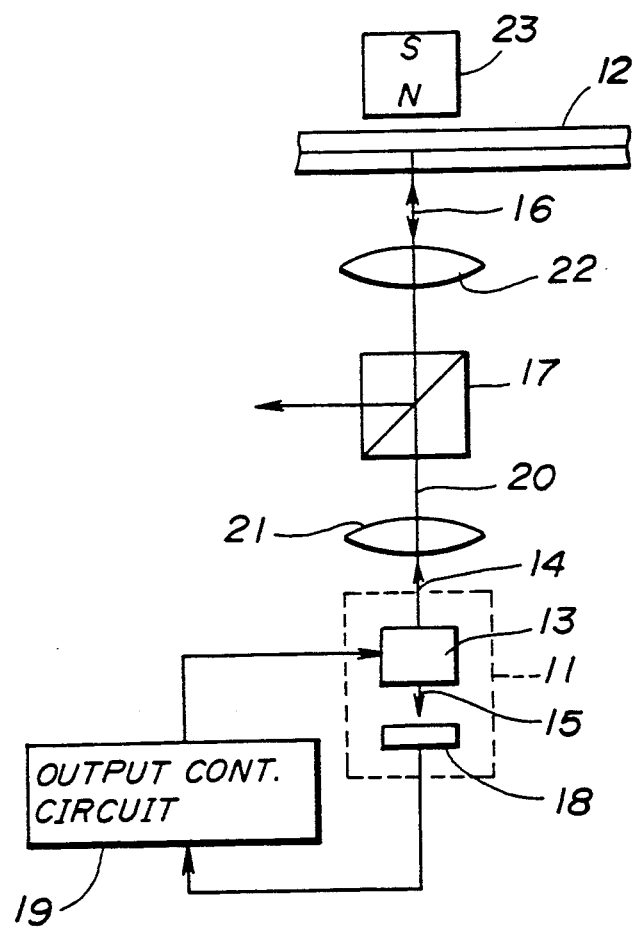
FIG. 1 is a view showing a configuration of a conventional optical disc apparatus.
Figure 2:
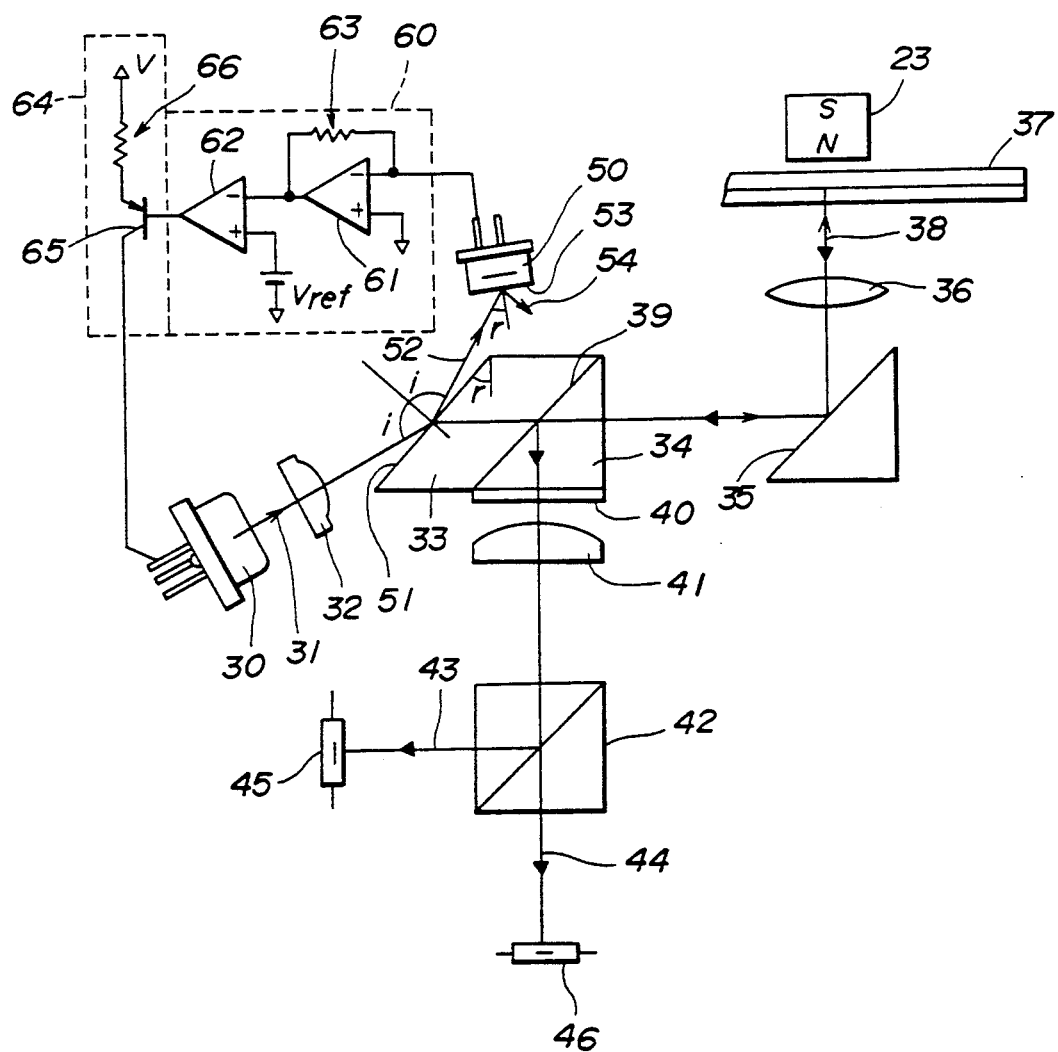
FIG. 2 is a view showing a first embodiment according to the present invention.

A first embodiment of an optical disc apparatus according to the present invention is shown in FIG. 2.

A laser beam 31 which is P-polarized light is emitted from a semiconductor laser element 30. This laser beam 31 passes through a collimater lens 32 to be made a parallel beam and is irradiated to a beam shaping prism 33. The laser beam 31 refracted by the incident surface 51 of the beam shaping prism 33 is shaped when it passes through the beam shaping prism 33. The laser beam 31 then passes through a prism 34, is reflected by the reflector prism 35, passes through the objective lens 36 and is focused on the optical disc 37.

The inclined surface of the prism 34 and the surface opposite the incident surface 51 of the beam shaping prism 33 to which the laser beam is irradiated is adhered by a adhesive made from ultraviolet cure resin and a ½ wavelength plate 40 is also adhered to the prism 34 in the same manner. This is to say that the beam shaping prism 33, the prism 34 and the ½ wavelength plate 40 are integrated and thus configure a single optical system component. A film is formed on the connection surface 39 of the prim 34 and the beam shaping prism 33. A grate part of a P-polarized light beam from the beam shaping prism 33 side passes through the film and a S-polarized light beam from the optical disc 37 side is reflected on the film.

A reflected beam 38 which is reflected by the surface of the optical disc 37, passes through the objective lens 36 in the direction opposite to that described above, is reflected by the reflector prism 35 and is irradiated to the prism 34. A part of the reflected beam 38 irradiated to the prism 34 is reflected by the film formed at the connection surface 39, passes through the lens 41 and is irradiated to the polarizing prism 42. The laser beam irradiated to the polarizing prism 42 is split into a first laser beam 43 and a second laser beam 44. The first laser beam 43 is focused to a light-receiving element 45 and the second laser beam 44 is focused to a light-receiving element 46. The signals output from the light-receiving element 45 and the light-receiving element 46 in accordance with the beams 43 and 44 are used as the basis for the generation of an information reproduction signal, a focus control signal in order to control the focus position of the laser beam, and a tracking control signal in order to control the irradiation position.

In the same manner as the conventional manner, a magnet 23 used for writing information, is provided facing the surface of the optical disc 37 that is not irradiated by the laser beam.

A part of the laser beam 31 irradiated to the beam shaping prism 33 is reflected by the incident surface 51. A photodiode 50 is provided at a position where a reflected beam 52 reflected by the beam shaping prism 33 is focused. An inclination of photodiode 50 is determined so that a beam 54 formed by reflection of reflected beam 52 on a light-receiving surface 53 of the photodiode 50 does not irradiate the semiconductor laser element 30. For example, the photodiode 50 is provided so that the reflected beam 52 is incident to the light-receiving surface 53 of the photodiode 50 t an angle which is the same as the apex angle r of the beam shaping prism 33. In addition, the reflected beam 38 from the optical disc 37 does not irradiate the photodiode 50. The reflected beam 38 does not also irradiate the semiconductor laser element 30.

The photodiode 50 outputs a detection signal with a level in accordance with the amount of incident light. The detection signal output from the photodiode 50 is then supplied to an output control circuit 60. This output control circuit 60 has a differential amplifier 61, a return resistor 63 connection an output terminal of the differential amplifier 61 and an inverting input terminal, and a differential amplifier 62 of which a reference power source $V_{ref}$ is connected to a non-inverting input terminal. The output terminal of the differential amplifier 61 is connected to the inverting input terminal of the differential amplifier 62. Then, the detection signal from the photodiode 50 is input to the inverting input terminal of the differential amplifier 61. The differential amplifier 61 outputs a signal corresponding to changes in the detection signals from photodiode 50. The output signal from the output control circuit 60, that is to say, the output signal from the differential amplifier 62 are supplied to a laser drive circuit 64. The laser drive circuit 64 has a PNP-type transistor 65, and a resistor 66 connected an emitter of this PNP-type transistor 65 and a power source V. The output signal from the output control circuit 60 are input to a base of the PNP-type transistor 65 and a collector of the PNP-type transistor 65 is connected to an input terminal of a laser diode 30.

When the intensity of the laser beam 31 from the laser diode 30 increases, the intensity of the reflected beam 52 at the beam shaping prism 33 increases and the level of the detection signal from the photodiode 50 increases accordingly. When this occurs, the level of the output signal from the differential amplifier 61 in the output control circuit 60 decreases and the level of the output signal from the differential amplifier 62 rises. This is to say that the base voltage of the PNP-type transistor 65 rises and the collector current of the PNP-type transistor 65 lowers and the intensity of the laser beam 31 emitted from the laser diode 30 lowers. With the lowering of the intensity of the laser beam 31, the level of the detection signal from the photodiode 50 to which the reflected beam 52 from the beam shaping prism 33 is irradiated lowers. When this occurs, the opposite of what has been described above occurs in that the level of the output signals from the output control circuit 60 lowers and the collector current of the PNP-type transistor 65 rises and the intensity of the laser beam 31 emitted from the laser diode 30 rises.

By the operation that has been described above, the intensity of the laser beam 31 emitted from the laser diode 30 is maintained at a predetermined level.

The reflected beam 38 from the optical disc 37 is not irradiated to the photodiode 50. In addition, the intensity of the reflected beam 52 at the beam shaping prism 33 and which is irradiated to the photodiode 50 corresponds precisely to the intensity of the beam emitted from the laser diode 30. Accordingly, the laser diode 30 is control without the influence of the return beam, the intensity of the laser beam emitted from the laser diode 30 is more stable than that which has been conventionally attainable.

When the incident angle of the laser beam 31 with respect to the beam shaping prism 33 is i, and the angle of inclination of the incident surface 51 with respect to the vertical surface is r, then the reflectivity R in the incident surface 51 can be expressed as follows.

$$R = \left[ \frac{\tan(i-r)}{\tan(i+r)} \right]^2 \tag{1}$$

In addition, the mutual relationship between the angles i and r, and the refractive index n of the beam shaping prism 33 is expressed as follows.

$$r = \cos^{-1}\sqrt{\frac{n^2-1}{n^2-m^2}} \tag{2}$$

$$i = \sin^{-1}(n \sin r) \tag{3}$$

When the material of the beam shaping prism 33 is BK-7 and the laser beam wavelength $\lambda = 780$ nm, for example, refractive index n and a magnification ratio m become n = 1.5107 and m = 0.38. Accordingly from the above formula (2) and (3), r = 39.2°
i = 72.8°.

Thus, the reflectivity R in accordance with formula (1) is

R = 7.2%.

Accordingly, if there is no loss of light between the laser diode 30 and the collimator lens 32, then a reflected beam 52 with an intensity of approximately 7% of the laser beam 31 can be used to perform output control of the laser diode 30. This value of 7% is a value sufficient for performing normal control.

Figure 3:
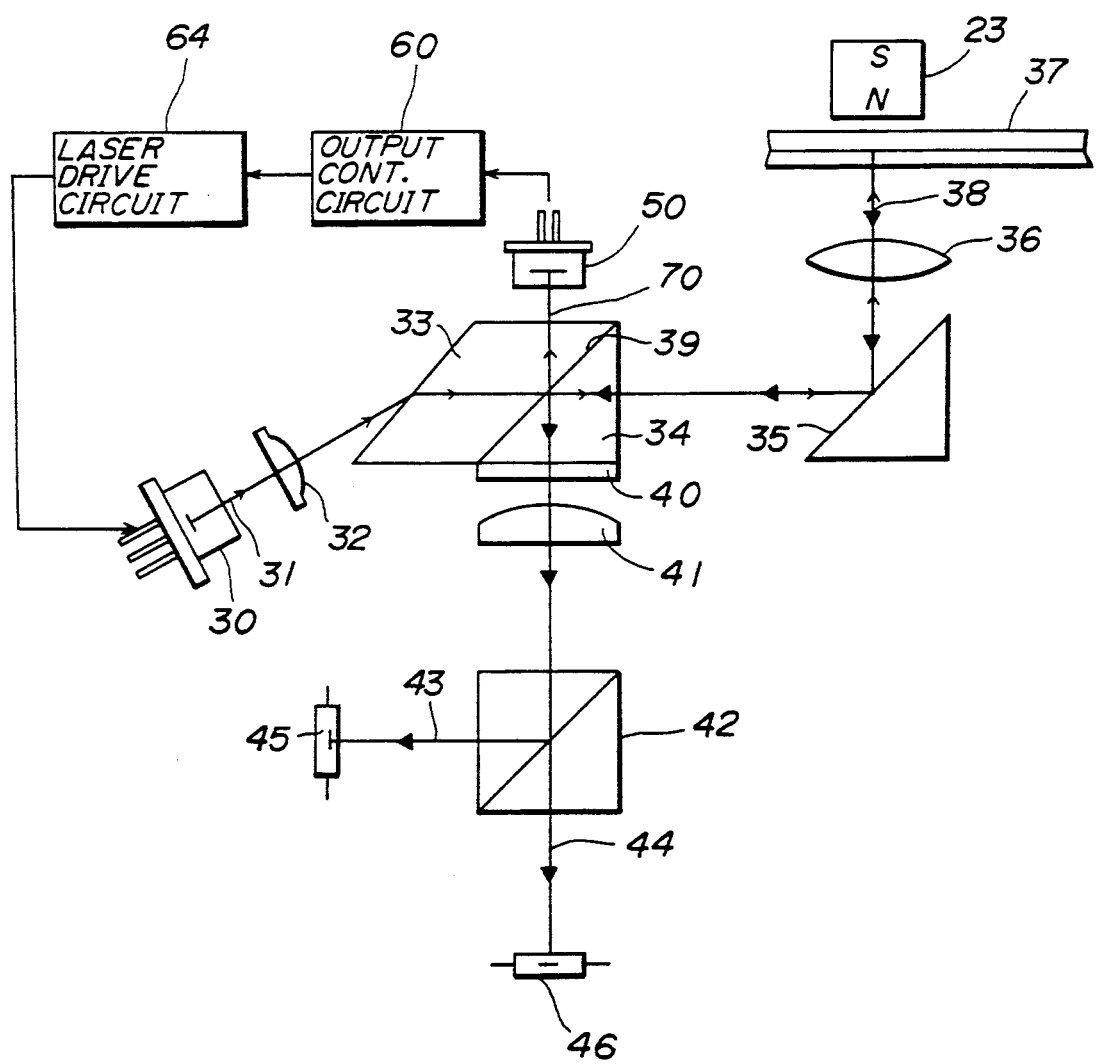
FIG. 3 is a view showing a second embodiment according to the present invention.

A second embodiment of an optical disc apparatus according to the present invention is shown in FIG. 3.

Those parts in FIG. 3 which are the same as those in FIG. 2 are indicated using the same numerals.

A part of the laser beam 31 emitted from the laser diode 30 is reflected by the connection surface 39 of the beam shaping prism 33 and the prism 34 on which the film is formed. In this second embodiment, a photodiode 50 is provided at a position where it receives a reflected beam 70 reflected by the connection surface 39. Then, the detection signal from this photodiode 50 is used as the basis for controlling the laser drive circuit 64 so that the intensity of the laser beam 31 emitted from the photodiode 50 is uniform.

In this second embodiment as well, the reflected beam 38 reflected by the optical disc 37 is not incident to the photodiode 50. Accordingly, in the same manner as described for the first embodiment, control of the laser diode 30 is performed without being subject to the influence of the return beam.

It is also possible to be controlled the laser 13 diode 30 on the basis of the reflected component of the laser beam on another optical part. However, when the loss of the light beam in the course of its transmission is considered, it is desirable that control of the laser diode be performed on the basis of the reflected beam in an optical part which is as close as possible to the laser diode (the light source).

As has been described above, according to the present invention, the intensity of a beam emitted from a light source is controlled to be uniform on the basis of the beam reflected at a portion of an optical system positioned between the light source and an optical disc, and so the intensity of the beam emitted from a light source can be stabilized without increasing the number of components of the optical system.

Accordingly, it is possible to realize a more compact optical disc apparatus that has few information reproduction errors.

The present invention is not limited to the aforementioned embodiment, and variations and modifications may be made without departing from the scope of the invention.

What is claimed is:

1. An optical disc apparatus, comprising:
 a light source emitting a light beam;
 an optical disc on which information is recorded;
 beam splitting means for splitting the light beam from said light source into a first beam to reproduce the information recorded on said optical disc and a second beam to control said light source, said beam splitting means including a prism having a surface reflecting a part of the light beam from said light source as said second beam, the remainder of said light beam passing through said surface as said first beam;
 light detection means for detecting said second beam and outputting a detection signal dependent on an intensity of said second beam;
 control means for controlling an intensity of the light beam from said light source on the basis of said detection signal from said light detection means, so that an intensity of the light beam from said light source is uniform; and
 an optical system through which said first beam passes, to reproduce the information recorded on said optical disc,
 wherein said prism of said beam splitting means and said optical system are arranged so that said first beam does not reach to said light detection means.

2. The optical disc apparatus as claimed in claim 1, wherein the light beam from said light source is incident onto said surface of said prism at a predetermined angle.

3. The optical disc apparatus as claimed in claim 1, wherein said prism includes a beam shaping prism.

4. The optical disc apparatus as claimed in claim 1, further comprising:
 a first transparent member which is integrated with said beam splitting means, and wherein the light beam from said light source passes through said first transparent member and is supplied to said beam splitting means.

5. The optical disc apparatus as claimed in claim 4, wherein said beam splitting means comprises a second transparent member having a connection surface connected to a surface of said first transparent member, and wherein the light beam from said light source passes through said first transparent member and is incident on said connection surface of said second transparent member at predetermined angle.

6. The optical disc apparatus as claimed in claim 5, wherein said first transparent member includes a first prism, and wherein said second transparent member includes a second prism, said first prism and said second prism being connected.

7. The optical disc apparatus as claimed in claim 6, wherein said first prism and second prism are adhered by a adhesive.

8. The optical disc apparatus as claimed in claim 7, wherein said adhesive comprises ultraviolet cure resin.

9. The optical disc apparatus as claimed in claim 6, said first prism includes a beam shaping prism.

10. The optical disc apparatus as claimed in claim 1, wherein said light detection means comprises a light-receiving surface on which said second beam is incident, and wherein said light detection means outputs said detection signal dependent on an amount of light of said second beam.

11. The optical disc apparatus as claimed in claim 10, wherein said light-receiving surface is inclined with respect to said second beam, so that a beam formed by reflection of said second beam on said light-receiving surface does not reach to said light source.

12. The optical disc apparatus as claimed in claim 1, wherein said light source has a semiconductor laser element.

13. The optical disc apparatus as claimed in claim 1, wherein said light detection means has a photodiode.

14. The optical disc apparatus as claimed in claim 12, wherein said control means has a laser power control circuit controlling an output power of said semiconductor laser element so as to be uniform.

* * * * *